United States Patent [11] 3,614,746

[72] Inventor Jacob Fredrik Klinkhamer
Emmasingel, Eindhoven, Netherlands
[21] Appl. No. 868,299
[22] Filed Oct. 22, 1969
[45] Patented Oct. 19, 1971
[73] Assignee U.S. Philips Corporation
New York, N.Y.
[32] Priority Oct. 31, 1968
[33] Netherlands
[31] 6815506

[54] MEMORY ADDRESSING DEVICE USING ARBITRARY DIRECTED GRAPH STRUCTURE
7 Claims, 14 Drawing Figs.

[52] U.S. Cl. .......... 340/172.5
[51] Int. Cl. .......... G06f 9/10, G06f 9/20
[50] Field of Search .......... 340/172.5; 235/157

[56] References Cited

UNITED STATES PATENTS

| | | | |
|---|---|---|---|
| 3,546,677 | 12/1970 | Barton et al. | 340/172.5 |
| 3,036,773 | 5/1962 | Brown | 340/172.5 X |
| 3,201,761 | 8/1965 | Schmitt et al. | 340/172.5 |
| 3,222,649 | 12/1965 | King et al. | 340/172.5 |
| 3,293,615 | 12/1966 | Mullery et al. | 340/172.5 |
| 3,331,056 | 7/1967 | Lethin et al. | 340/172.5 |
| 3,412,382 | 11/1968 | Coleur et al. | 340/172.5 |

*Primary Examiner*—Gareth D. Shaw
*Assistant Examiner*—Sydney R. Chirlin
*Attorney*—Frank R. Trifari

ABSTRACT: Data-processing system comprising an addressing device for addressing in a directed graph structure in a store which is divided for this purpose into tables each having a reference address as a table base. Relative to the table base, the words to be found numerically in the table are reference addresses for a further table or operands or indirect addresses for operands. In order to permit highly flexible addressing in a directed graph structure, the address portion of an instruction and/or any sequential words contains an arbitrary number of address components which may have different lengths. The table words may have table length data of a further table to permit a length check and addressing in overflow tables.

INVENTOR.
JACOB F. KLINKHAMER
BY
AGENT

INVENTOR.
JACOB F. KLINKHAMER
BY
Frank R. Trifari
AGENT

INVENTOR.
JACOB F. KLINKHAMER
BY
AGENT

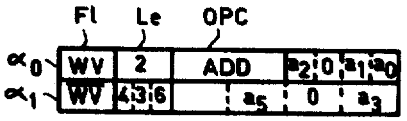

fig.8a

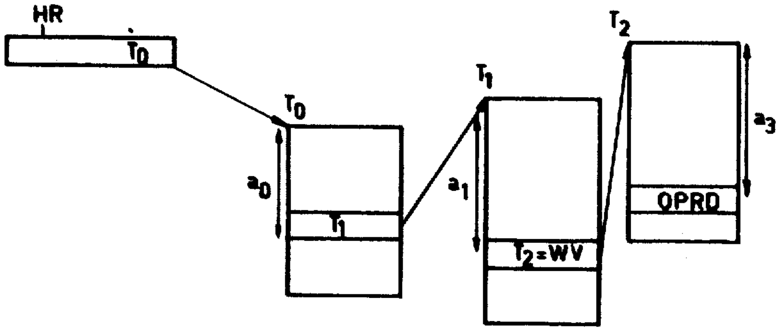

fig.8b

| | MR | | | | CR | | | TABEL I | | | |
|---|---|---|---|---|---|---|---|---|---|---|---|
| | | | MRA | | | | CRA | | | | |
| Fa | MRF | MRL | MROPC: | MK | CRF | CRL | CROPC: | OPCDEC | SEL | FF | BM |
| 0 | WV | 2 | ADD: $a_2 0 a_1 a_0$ | ----- | -- | -- | --- --- | --- | $\alpha_0$ | 0 | |
| 1 | -- | -- | ← $T_0$=(HR) → | 00000011 | WV | 2 | 0 $a_2 0 a_1 a_0$ | ADD | 0 | 1 | ($\alpha_0$) |
| 2 | -- | -- | ← $T_0$ → | 00000011 | WV | 2 | 0 $0 a_2 0 a_1$ | ADD | $T_0+a_0$ | 1 | |
| 1 | -- | -- | ← $T_1=(T_0+a_0)$ → | 00000011 | WV | 2 | 0 $0 a_2 0 a_1$ | ADD | $T_0+a_0$ | 1 | |
| 2 | -- | -- | ← $T_1$ → | 00000011 | WV | 2 | 0 $0 0 a_2 0$ | ADD | $T_1+a_1$ | 1 | $(T_0+a_0)$ |
| 3 | -- | -- | ← $T_2=(T_1+a_1)$ → | 00000011 | WV | 2 | 0 $0 0 a_2 0$ | ADD | $T_1+a_1$ | 1 | |
| 4 | -- | -- | ← $T_2$ → | 00000011 | -- | -- | ← $T_2$ → | ADD | $\alpha_1$ | 1 | $(T_1+a_1)$ |
| 0 | $\overline{WV}$ | 4,3,6 | $a_5$ 0 $a_3$ | 00000011 | -- | -- | ← $T_2$ → | ADD | $\alpha_1$ | 1 | |
| 1 | -- | -- | ← $T_2$ → | 00001111 | $\overline{WV}$ | 4,3,6 | $a_5$ 0 $a_3$ | ADD | 0 | 1 | ($\alpha_1$) |
| 2 | -- | -- | ← $T_2$ → | 00001111 | $\overline{WV}$ | 4,3,6 | 0 $a_5$ 0 | ADD | $T_2+a_3$ | 1 | |
| | ← OPRD = $(T_2+a_3)$ → | | | 00001111 | $\overline{WV}$ | 4,3,6 | 0 $a_5$ 0 | ADD | $T_2+a_3$ | 1 | |

fig.8c

INVENTOR.
JACOB F. KLINKHAMER
BY
[signature]
AGENT

INVENTOR.
JACOB F. KLINKHAMER
BY
[signature]
AGENT

INVENTOR.
JACOB F. KLINKHAMER
BY
AGENT

| | MR | | | | | CR | | | | TABEL II | | | | |
|---|---|---|---|---|---|---|---|---|---|---|---|---|---|---|
| | | | MRA | | | | | CRA | | | | | | |
| Fa | MRF | MRL | MROPC | | SR | CRF | CRL | CROPC | | OPCDEC | SEL | $FF_1$ | $FF_2$ | BM |
| 0 | WV | 4 | ADD | 3 1450 | 0 | — | — | — | | — | α0 | 0 | 0 | |
| 1 | PT | 5 | | $T_0$ | 3 | WV | 4 | 14 | 5 0 | ADD | 0 | 1 | 0 | (α0) |
| 2 | PT | 5 | | $T_0$ | 14 | WV | 4 | 5 | | ADD | $T_0+3$ | 1 | 0 | |
| 1 | PT | 6 | | $T_1$ | 14 | WV | 4 | 5 | | ADD | $T_0+3$ | 1 | 0 | |
| 2 | PT | 6 | | $T_1$ | (14-6)8 | WV | 4 | 5 | | ADD | $T_1$ | 1 | 1 | $(T_0+3)$ |
| 1 | PT | 9 | | $T_1'$ | 8 | WV | 4 | 5 | | ADD | $T_1$ | 1 | 1 | |
| 2 | PT | 9 | | $T_1'$ | 5 | WV | 4 | 0 | | ADD | $T_1'+8$ | 1 | 0 | $(T_1)$ |
| 1 | PT | 5 | | $T_0$ | 5 | WV | 4 | 0 | | ADD | $T_1'+8$ | 1 | 0 | |
| 2 | PT | 5 | | $T_0$ | 0 | WV | 4 | 0 | | ADD | $T_0+5$ | 1 | 0 | $(T_1'+8)$ |
| 3 | PT | 3 | | $T_4$ | 0 | WV | 4 | 0 | | ADD | $T_0+5$ | 1 | 0 | |
| 4 | PT | 3 | | $T_4$ | 0 | PT | 3 | | $T_4$ | ADD | α1 | 1 | 0 | $(T_0+5)$ |
| 0 | WV | 5 | 2 | 10 46 | 0 | WV | 3 | | $T_4$ | ADD | α1 | 1 | 0 | |
| 1 | PT | 3 | | $T_4$ | 2 | WV | 5 | 10 | 4 6 | ADD | 0 | 1 | 0 | (α1) |
| 2 | PT | 3 | | $T_4$ | 10 | WV | 5 | 4 | 6 | ADD | $T_4+2$ | 1 | 0 | |
| 1 | OT | 8 | | A | 10 | WV | 5 | 4 | 6 | ADD | $T_4+2$ | 1 | 0 | |
| 2 | OT | 8 | | A | (10-8)2 | WV | 5 | 4 | 6 | ADD | A | 1 | 1 | $(T_4+2)$ |
| 1 | OT | 4 | | A' | 2 | WV | 5 | 4 | 6 | ADD | A | 1 | 1 | |
| 2 | OT | 4 | | A' | 4 | WV | 5 | 6 | | ADD | A'+2 | 1 | 0 | (A) |
| AP/Int | | | OPRD | | 4 | WV | 5 | 6 | | ADD | A'+2 | 1 | 0 | |

fig. 10c

INVENTOR.
JACOB F. KLINKHAMER
BY
AGENT

MEMORY ADDRESSING DEVICE USING ARBITRARY DIRECTED GRAPH STRUCTURE

The invention relates to a data-processing system comprising a device for addressing with the aid of a computer instruction whose address portion is arrayed in accordance with a directed graph structure in the computer store. The store is divided to this end into tables, which have each a reference address as a table base. The words to be found in numerical sequence relatively to the table base in a table may be reference addresses for a further table or operands or indirect addresses for operands. The addressing device comprising a register for storing an instruction, a register for storing a table word selected from a storage table, and an adder by which the combination of a reference address and a word number results in the absolute table word address being formed by which the table word concerned can be selected.

For addressing in very extensive computer stores suitable for such uses in multiprogramming and for use in time-sharing configurations, progressive use is made of a "directed graph" structure array in the computer store, which means that a coherent block of data comprises a plurality of reference to other blocks. Accordingly, there is desired an addressing method which permits rapid finding of a path along a chain of references. An example of the known method and an embodiment of the invention will be described with reference to the drawings.

In the drawings:

FIG. 1 illustrates an example of a known method;

FIG. 2 illustrated an example of a directed graph structure;

Figure 9:
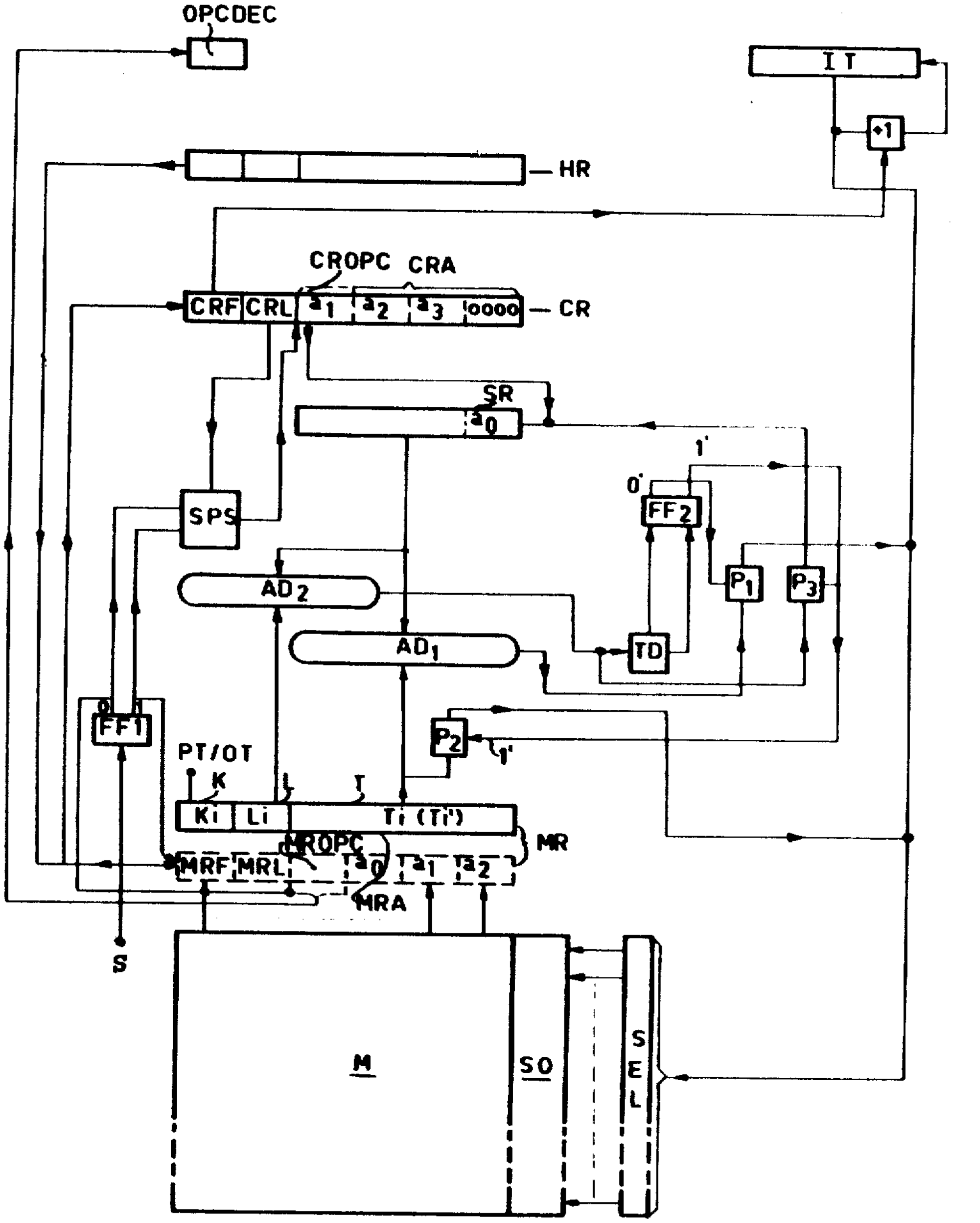
Figure 10A:
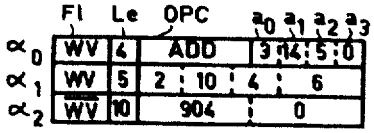

FIGS. 8*a*, *b*, *c* show a numerical example of the addressing method in accordance with the invention;

FIG. 9 shows an extended device embodying the invention;

FIGS. 10*a*, *b*, *c* show a numerical example for the embodiment shown in FIG. 9.

Figure 1:
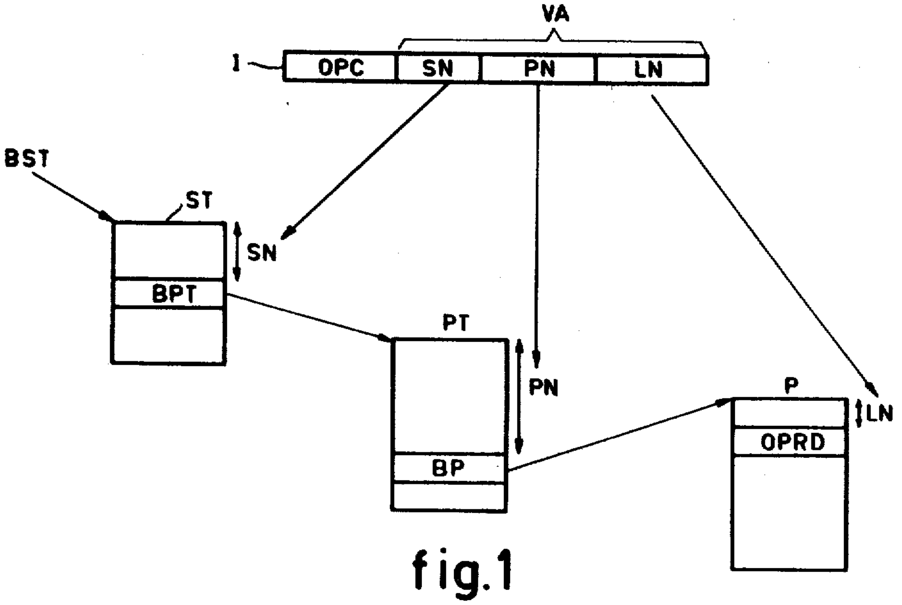

A known hardware solution (described in "Fall Joint Comp. Conference" Vol. 27, Part 1, 1965, pages 197 to 202) for finding a desired address by one instruction consists in that the address part of an instruction I, forming a virtual address VA is divided into three parts (see FIG. 1); SN = segment reference number, i.e. a number of a portion of a computer store divided into large portion, PN = page number i.e. the number of a page of a segment divided into pages and LN = line number i.e. the number of a line of a page divided into lines. The lines of a page store the operands OPRD of the desired absolute address. There is also a segment able ST having a basic address BST where at a segment number (SN) thus having a position relative to the basic address BST of the segment table the basic address BPT of the associated page table PT is found. In the page table PT a page number PN having a position relative to the page table base BPT of the page table provides the basic address BP of the associated page P. On this page the location LN numbered relatively to the page base address BPN is the desired absolute address having the operand OPRD.

In the notation $y=(x)$, wherein $y$ = contents of the address $x$ ($y$ itself may again be an address) the said operand is given by: OPRD= (((ST+SN)+PN)+LN). The operand is thus found in one instruction. Inside the instruction three storage accesses are performed, which provides an increase in speed and a simplification as compared with said soft-ware solution in which a number of instructions have to be worked up. This known hardware solution has been developed for the purpose of placing at the disposition of a programmer a very large "virtual" store, whereas at any instant of the performance of a program as far as possible only those parts of the store are written in the computer store which are being processed. This purpose is more restricted than that aiming at the possibility of addressing via any directed graph structure. The known addressing device is not appropriate to satisfy this purpose of addressing via an arbitrary directed graph structure.

The invention has for its object to provide a data-processing system comprising an addressing device of the kind set forth, which is characterized in that for addressing in any directed graph structure the arrayed address portion of an instruction comprises an arbitrary number of address components whereas in this arrayed address portion every next-following address component is the number of a word in a table found previously with the aid of the preceding address component (s). The addressing device includes an adder in which an address component is combined with a previously found reference address serving as a table base. To achieve a correct combination of these two addresses, the register containing the instruction is extended by a device selecting the relevant address component and comprising at least one additional register and a control device producing a shift of a component equal to the length in bits. After the selection in the selection device an address component to be processed is available for the adder.

Figure 2:
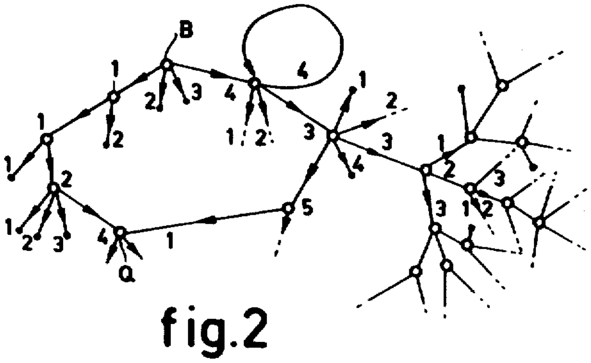

The use of an arbitrary directed graph structure for addressing resembles the outlay of a book divided into sections and subsections. For example, section 3.7.5.2. is the second subsection of the fifth subsection of the seventh subsection of the third section. The advantage of such a layout is that there is a great freedom in adding or striking subsections without the need for drastic variation of the further numbering. A variant not found in the layout of a text, but of essential importance in computer store addressing consists in that one piece of information, for example, a repeatedly used subroutine or a table of constants may act as a subsection for more than one other section. In addressing by the arbitrary directed graph structure this subsection need figure only once in the store, because such a section can be addressed in different ways. See by way of example the possible modes of addressing a point Q in a directed graph structure as illustrated in FIG. 2. Therein a circle represents a table base with the associated table, which is found with the aid of a reference address. A table contains the table words in a numerical order relative to the table base. These table words may be operands or indirect addresses indicated by a dot or reference addresses for a further table, indicated by a circle.

Starting by an initial table B the point Q may be addressed as 1.1.2.4. but also as 4.3.5.1. and, for illustrating the possibility of forming closed addressing loops, also as 4.4.3.5.1. or 4.4.4.3.5.1. etc.

In general, if a table corresponds to every branch point (circle in FIG. 2) of the directed graph a position $d$ of a branch point $a$, $b$,... $c$ may have a reference to the first address (= basic address) of the table of a further branch point $a$, $b$,... $c$, $d$. When the table of the branch point B stands at a basic address $T_o$, the branch point (= table basic address) $a$,$B$, $c$, $d$ is found as the contents of $(((((T_o+a)++b)+...)+c)+d)$ or in other words by an interrupted interative process, in which further reference address is found as the contents of the address formed by the $n^{th}$ = reference address plus the $n^{th}$ = address component of the computer instruction. It is sometimes said that a directed graph structure for addressing is or comprises a tree structure. Such a tree structure is a mode of fine ramification in the store. A typical tree structure is illustrated in FIG. 2; from the branch point 3 of the directed graph structure of FIG. 2 a tree has a structure: 3→3, 1→, 3.2→, 3,3→, etc. In order to obtain a still more flexible directed graph structure addressing, the data-processing system in accordance with the invention is characterized in that the addressing device comprises a storage element which indicates the presence of an instruction having a number of address components or a sequential word following the instruction or a preceding sequential word having one or more address components to be processed. The sequential word (s) together with the instruction determine a complete operand address, and the instructions and any sequential words have a bit indication in an especially economized field for the presence or absence of one or any further sequential work by which an instruction counter can be stepped on by +1. A further increase in flexiblity may be obtained in the data-processing system in accordance with the invention in addressing in said directed graph structure with instructions and any sequential words, which may both have address components of different lengths. The bit lengths of the address components of an instruction and any sequential words being written separately in a field of the instruction and in a field of any sequential words, by causing the control device under the control from said field of lengths of an instruction and any sequential words to produce a variable shift which is equal to the variable bit lengths of the address components of the instruction and any sequential words. In the latter case it may be inconvenient to write a plurality of different bit lengths of address components of an instruction or of a sequential word in the field of lengths provided for this purpose, for example on account of space. In order to obviate this drawback a further device embodying the invention is characterized in that the bit lengths of he address components of an instruction and/or any sequential words are written in a separate table which is accessible from the field of lengths of the address components of an instruction and/or any sequential words and from which the control device can be adjusted. This device provides furthermore he possibility of carrying out a check by means of a small extension for assessing whether there is addressed by an address component beyond a table of a given length. In many cases addressing beyond a given table is not allowed, so that a machine interrupt will result therefrom. In the device in accordance with the invention this known, frequently used length check can be carried out in a simple manner. Apart therefrom the device in accordance with the invention provides the possibility of performing an effective addressing process with the aid of overflow tables in the event of transgression of the length of a table. In order to have a possibility of performing a length check and addressing in an overflow table a further device embodying the invention is characterized in that a table word has a table-length field for a next table, and the addressing device includes a second storage element and a second adder, followed by a sign detector which indicates whether the difference between an address component and the table-length datum of the relevant table formed during an addressing phase in the second adder is positive or negative and which controls the second storage element; if an address component lies within the table length, the second storage element controls a first gate by which the table reference address of the register storing the table word can be applied to the first adder, through which first gate the result of the addition of the address component and of the table reference address can be transmitted to the storage selection register; if an address component lies beyond the table length, the second storage element controls a second gate and a third gate, the second gate being capable of transmitting the table reference address as a basic address or, if necessary, completed to an address in the table which has a reference address as the table base of an overflow table to the storage selection register, where the reference address to the overflow table base is selected, whereas the third gate is capable of transmitting the difference between the address component and the table length formed in the second adder to the register portion of the device selecting the address component, after which the address is formed in the first adder is the overflow table. In a further development the device is characterized in that a table word comprises a table class datum of a next table, the addressing process being interrupted when the table class datum indicates that an operand table is following, and in that the table class datum provides information about the permission or nonpermission of a further addressing or operation step (inhibition or inhibition).

Figure 3:
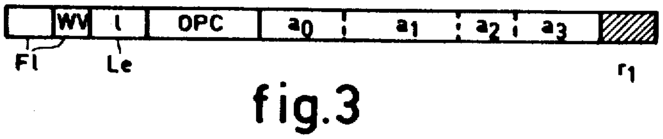
FIG. 3 shows the composition of an instruction to be used in a device in accordance with the invention.

FIG. 3 illustrates a machine instruction for use in a device in accordance with the invention. The field $F_1$ is the so-called flag field in which various data with respect to the instruction are stored. One of these data may be the datum WV relating to the presence or absence of a sequential word or sequential words (VW) following the instruction. The flag field may furthermore comprise a bit which indicates that at the absolute storage address to be finally found an operand is concerned or a further indirect address is found by which, after further indirect addressing again in accordance with a directed graph structure or by known indirect addressing methods the address of the operand is finally found. The filed $L_e$ is filled with the data relating to the lengths $1_i$ in bits of the address components $a_0, a_1, a_2$, etc. in the instruction. The field $L_e$ may also comprise a reference to a table in which the lengths $1_i$ of the individual address components are separated. The latter may be necessary or useful in those cases in which space is lacking in the instructions for accommodating all different length data. The instruction comprises an operation code field filled with an operation code OPC. The instruction is furthermore filled with a plurality of address components equal to or lower than the number of times an address component of the length $l_1$ fits in the in instruction size. With different component lengths there will always be also complete components. There may be left a residue $r_1$ not used for addressing. It should be noted that the division in an instruction may be differently arranged. For a given purpose it may, for example, be useful to write the address components from right to left instead of from left to right in the instruction, any remaining part $r_1$ then lying directly after the operation code OPC.

Figure 4:
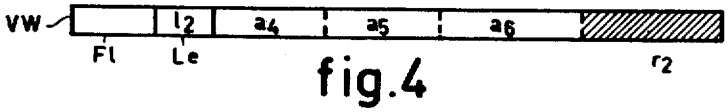
FIG. 4 shows the composition of a sequential word to be employed in a device in accordance with the invention.

FIG. 4 illustrates a sequential word format VW to be used as a word following the instruction described above. This sequential word also has a flag field Fl, which may contain a number of general data. one of these data may be a VW datum indicating the presence or absence of a sequential word VW after the former sequential word. The field $L_e$ comprises the length data $1_2$ of the address components $a_4$, $a_5$, $a_6$ of the sequential word. These lengths $1_2$ need not be equal to the lengths $l_1$ in the instruction itself. The field $L_e$ may in this case also have a reference to an address-component-length table.

The sequential word does not contain an operation code. It may have a residue $r_2$ not used for addressing.

Figure 5:
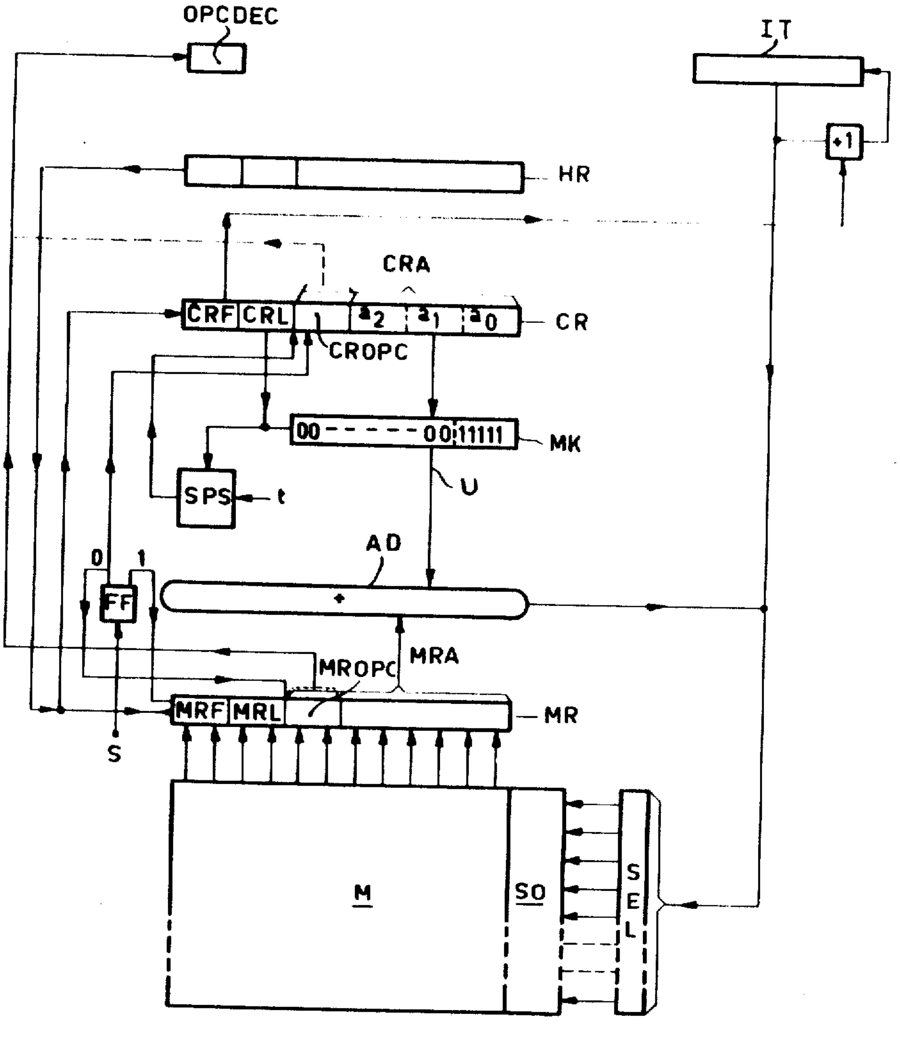
FIG. 5 shows a first embodiment of a device in accordance with the invention.

FIG. 5 shows an embodiment of a device in accordance with the invention. It should be noted that in this Figure and in the further Figures the connecting lines between store, registers and the like may apply both to parallel and series transmission of the information between the parts. This depends upon the practical design and is not essential for the invention. The arrangement comprises a store M with selection members SO and a selection register SEL. The contents (SEL) of the address in the selection register SEL can be read from the store M and transferred to a register MR and conversely the contents (MR) of the storage register MR may be written at an address indicated in the register SEL of the store M. The storage register MR is divided into a number of fields: MRF for storing the aforesaid flag field, Fl for storing an instruction or a sequential word, MRL for storing the said length data, Le for storing an instruction or a sequential word, MRA for storing the address components $a_0$, $a_1$,.... If MR contains a sequential word, the part MRA is completely available for the address components and when an instruction is contained in MR the part MROPC is reserved for storing the operation code, whereas the remainder of the part MRA serves for storing address components. The contents of register MR, hereinafter designated by the general notation (MR), may be taken over as a whole or with the exception of the field MROPC in a control register CR having an identical field division designated by CRF, CRL, CROPC and CRA as the register MR. The contents of the field MROPC (MROPC) may also be transmitted to the operation decoding device OPCDEC.

The register MR may be filled not only from the store M but also from the register CR and one or more auxiliary registers HR, which will be referred to hereinafter. The device AD is an adder and IT is an instruction counter. In this example the address-component-selecting device according to the invention comprises a mask register MK and a control device SPS and a further storage element, for example, a flip-flop FF, which is required in connection with the potential presence of one or more sequential words after an instruction. The mask register MK in this embodiment is filled under the control of the length field MRL or CRL of register MR or CR respectively from the right with a number of "1"'s equal to the bit length of an address component present in CRA. After a first or a further address component has been processed, the control device SPS, under the control of a pulse at the input $t$ and governed from the length field CRL of register CR produces a shift of the contents of register part CRA over a number of positions equal to the bit length of the relevant address component. If an instruction with potential sequential words is concerned, a storage element FF is provided. It will be assumed that with phase O (see hereinafter) = FF, controlled via the input S=1, when a sequential word VW is read in register MR. When an instruction is read, FF=0 through the line 0 ensures that in this embodiment of OP-code in the field MROPC of the register MR is not transmitted to the field CROPC of the register CR, but is transmitted to the operation decoder. OPCDEC. In this case the field CROPC of the register CR is filled with 37 0"'s. When a sequential word is read, FF=1 through the line 1 ensures that the whole contents of register MR get into register CR. After the transmission of the contents of register MR to the register CR, FF=O may become 1, in which state the flip-flop FF remains at least to the termination of the addressing concerned. The common output pattern of the register CR and MK is such that there appear at the bit position = the logical product $mk_i$ $CRA_i$ (= the AND designation) of bit $mk_i$ of register MK and bit $CRA_i$ of the address-component portion CRA of register CR. In other words: the mask register MK screens off all bits of register CR, where register MK contains "0"'s.

In this manner the address components $a_o$, $a_1$, etc. appear in order of succession at the output U of the mask register MK. An address component appearing at the output U is applied to the adder ad, where it is combined to form an absolute address (i.e. the table word address) with the address present at the instant concerned in the storage register portion MRA and being a reference address serving as a table base from the store M or completed at the initiation of an addressing process from the auxiliary register (s). HR. This absolute address enters the selection register SEL and performs reading of the contents of this absolute address in the store M. These contents may be a reference address as a base of a further table, which again appears at the location MRA of register MR, etc. until all address components have been processed and only "O"'s are standing before the "1" mask of the mask register MK. The instruction counter IT, which is also connected with the selection register SEL, may obtain, for example, the address of an instruction which has been first selected from the store prior to said addressing process and has been written in register MR. The instruction counter IT is stepped on from the flag field CRF of register CR by one (+1), when the instruction or a preceding sequential word is followed by a further sequential word. By the new contents of the instruction counter IT a sequential word can then be selected in store M.

Figure 6:
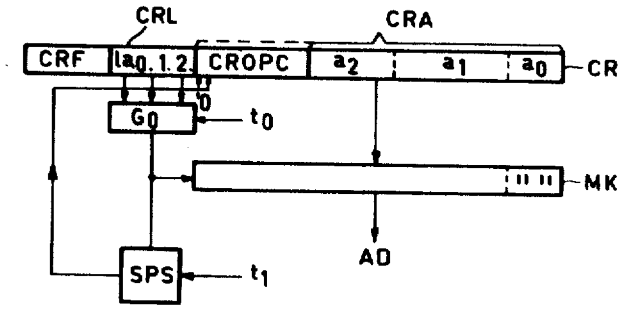
FIGS. 6 and 7 show a modified form of the device embodying the invention.
Figure 7:
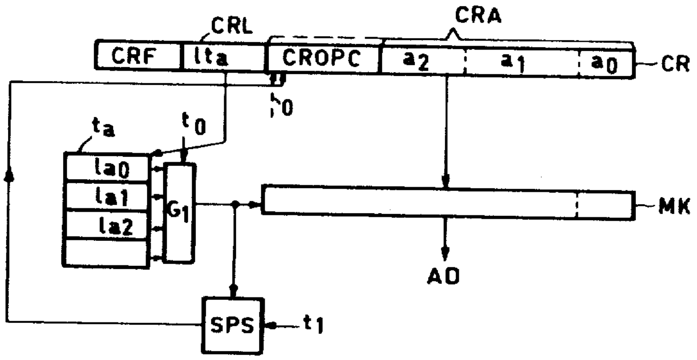

FIGS. 6 and 7 show slightly different embodiments of a device in accordance with the invention. These embodiments serve for processing an instruction or a sequential word with address components of different lengths.

FIG. 6 illustrates this posibility, when the length data $1a_o$, $1A_1$, $la_2$ of an instruction or of a sequential word are present in the length field LE or in the register CR length field CRF. The embodiment comprises a gate circuit $G_o$, which under the control of a control pulse $t_o$, appearing in each cycle of processing of an address component (see hereinafter), hence at the beginning of processing of every new address component, passes, in accordance with the address component in turn, the length datum i $a_o$, $1a_1$, $1a_2$ to the mask register MK and the control device SPS. On the basis of such a length datum the mask, i.e. a corresponding number of "1"'s is adjusted in the mask register MK. The control device SPS produces in the next phase (phase 1, see hereinafter) under the control of $t_1$, a shift of the contents of register portion CRA of register CR, which shift is therefore also determined by the address-component length datum previously indicated. FIG. 7 illustrates a potential solution of the case in which lengths of the address components are present in a separate table $ta$, which may be a storage portion reserved for this purpose, and which is accessible from the address-component-length field CRL of register CR with the aid of the length-table address $1ta$ contained therein. This table $ta$ contains the length data $1a_o$, $1a_1$, etc. The indication of a desired length datum in the table $ta$ is also performed in the embodiment of FIG. 6 by a relevant control-pulse $t_o$, which controls a gate $G_1$. At the beginning of processing of every new address component the gate $G_1$ passes the relevant length datum $1a_o$, $1a_1$, etc. to the mask register MK and the control device SPS. For the further operation reference may be made to the description of FIG. 6.

For further explanation of the operation of the device embodying the invention a microprogram is given hereinafter, which performs addressing in directed graph structure. A number of phases may be distinguished. The duration of one phase is considered to be as long as is required for the processes to be performed within it. It is therefore not impossible that one phase has a longer duration than another. The notation ($y$): =($x$) means that register $y$ takes over the contents of register $x$. Thus (MR):=((SEL)) means that register MR takes over the contents of the storage location in the store M, which is indicated by the contents of SEL, or in other words, this means normal readout of the store.

| Phase processing | Explanation |
|---|---|
| 0 (a) (FF=0):=1 or FF=1 | In reading an instruction in register MR the storage element FF is in 0-state and changes to 1. In reading a sequential word in register MR storage element FF is in the state 1. |
| (b) If FF=0, then (CR) except when (CROPC):=(MR) (CROPC):=0 (OPCDEC):=(MROPC) (MR):=(HR). | An instruction is passed from register MR to register CR with the exception of MROPC-field, which is passed to the operation decoder. The CROPC-of register CR is filled with "0"s. Register MR is filled from auxiliary register HR with a basic address $T_0$ of the first reference table, also designed $T_0$. |
| (c) If FF=1, then (CR):=(MR) (MR):=(CR). | If a seq. word is read, register CR is filled as a whole from register MR. Register MR obtains the former contents of register CR and this is the last reference address (see Phase 3) of a preceding instruction or sequential word. |
| (d) If store is of the destructive read-out type "DRO" "DRO", then ((SEL)):=(MR). | The contents of register MR are written back in M in the case of a destructive-read-out store M. When the store M is not of the DRO-type. This is not necessary. |
| (e) (SEL):=0 | The selection register SEL is filled with "0"s. Address 0 is assumed to be a not destructive-read-out address. This instruction serves to prevent writing back of the store contents in the next phase. |
| (f) (MK):=$2^{(MRL)}-1$ | This means that the mask register MK is filled with a number of "1"s (from right to left), equal to the bit length of an address component (as is found in field MRL). E.g. MRL=3 bits: $2^3-1=7$ or else binary 111 (three "1"s). |
| (g) Phase:=1 | This means: under all conditions phase 0 is followed by phase 1. |
| 1 (a) (SEL):=(MRA)+(CRA) $\lambda$ (MK). | The reference address previously formed or contained in register portion MRA ($T_i$ or $T_0$) is raised in the device AD with the instantaneous address component indicated with the aid of the address-component-selection device with register MK (Processing: (CRA)$\lambda$(MK)), the result being a table word address ($T_i+a_i$ or $T_0+a_0$), and passed into the selection register SEL. |
| (b) If (SEL)=destructive-read-out type-address, then ((SEL)):=(MR). | The former reference address (of a table) has to be returned into the store, when the store is of the destructive-read-out type, in order to avoid loss thereof (see Phase 0.(d)). |

| Phase processing | Explanation |
|---|---|
| (c) (CRA):=(CRA)×2^-(CRL). | This applies to the shift over the length of one address component (given in field CRL) of the address portion CRA of register CR by the control by the control-device SPS. In this example a shift to the right. Thus either the next address component or 0 is placed in front of the 1-mask in register MK. |
| (d) Phase =2 | |
| 2 (a) (MR):=((SEL)) | Then the new reference address, the operand or the indirect address for the operand ($T_{i+1}=(T_i+a_i)$ or ($T_1=(T_0+a_0)$)) is read out to register MR. |
| (b) If (CRA)∧(MK)≠0 then phase: =1. | The cycle phase 1-phase 2 is repeated as long as there is an uninterrupted sequence of address components=0 in register portion CRA of register CR. |
| (c) If (CRA)∧(MK)=0∧((CRF)=WV) then phase=3. | If either an address component=0 is found or the address components of the word being processed are exhausted, and if in addition the WV-field in the flag field of the instruction being processed or of the sequential word being processed is indicative of a sequel (condition ((CRF)=WV)), reading-out of a sequential word is initiated in phase 3. |
| (d) If (CRA)∧(MK)=0∧((CRF)=$\overline{WV}$) then phase:=function (OPCDEC). | If no sequential word has to be expected (condition: ((CRF)=$\overline{WV}$)) and if an address component=0 is found or if the address components are exhausted, the intended operand is read out (and is then in register MR). The continuation of the process is then determined by the OP code in the OPCDEC. |
| 3 (a) (CR):=(MR) | The sequential word has to be read out. To this end register MR has to be released. The last reference address of the preceding word therein (instruction or previous sequential word) must not get lost, since it serves as a reference address for the sequential word itself. Therefore (MR) is saved in register CR. |
| (b) If (SEL)=destructive-read-out address (DRO) then ((SEL)):=(MR). | See under Phase 0 sub (d). |
| (c) (SEL):=(IT)+1 | This means the setting of the address of the sequential word. The instruction counter being aware of the presence of a sequential word (condition VW in the flag field of the preceding word) has stepped on by 1. |
| (d) Phase:=4 | |
| 4 (a) (MR): =((SEL)) | The sequential word is read from store M and enters register MR. |
| (b) Phase: =0 | Back tomPhase 0 and thus owing to the presence of a sequential word FF=1. |

The table I of the drawing (FIG. 8*c*) illustrates a simple example of addressing for the case shown in FIGS. 8*a*, *b*. Referring to FIG. 8*a* reference $\alpha_0$ designates an instruction having a flag field F1 filed with an indication of a sequential word (WV) and having a length field L*e* filled with the bit lengths of the address components $a_1$, $a_2$, *o* and $a_3$ (here of equal lengths, i.e. 2) bits. The operation code field OPC gives by way example an operation ADD > adding. $\alpha_1$ is the sequential word having in the flagfield F1 the indication that no sequential word is to be expected and that address components of different lengths are present. The length field L*e* has the indication that the address components $a_5$, *o*, $a_3$ have a length of 4 bits, 3 bits and 6 bits respectively. In table I under the heading F*a* the various phases are indicated. The register or register portion references: MR, C*r*, MRF etc. are self-explanatory on the basis of the notations of FIG. 5. The column BM indicated what is left in the store M or what is written back in its in the case of a destructive readout storage. In connection with the above description of the operation of the device in accordance with the invention the table will be self-explanatory.

FIG. 9 shows an elaborate form of the device in accordance with the invention. The extension is intended to check whether an addressing process is being performed beyond a table of a given length by the processing of an address component. The extension provides the possibility of carrying out the addressing process in a so-called overflow table. With exception of the first storage element FF, which is now referred to as $FF_1$, and of the further additional parts, the references of FIG. 9 correspond with those of FIG. 5. A further difference is that the mask register MK of FIG. 5 is replaced by a register SR, which may be considered to form a portion of register CR which is filled with the consecutive address components $a_0$, $a_1$, etc. shifted from the register CR under the control of the control device SPS. Moreover, the adder AD is considered to be replaced by an adder $AD_1$ and an adder $AD_2$. If an instruction I is present in the register MR and the operation code therein OPC is transferred to the operation decoding device OPC-DEC, the portion CROPC does not have an address component so that under the control of the first storage element $FF_1$ via conductor 0 the control device causes the address components to be shifted over the first address component length plus the length of the operation code field CROPC. The first address component $a_0$ thus arrives at its correct place in register S*r*. It should be noted that in this case the address components may be from right to left in the register CR, in which case the shift is to the right (see the device of FIG. 5).

In this example a table T (see register MR of FIG. 9) has a portion K and a portion L. The portion K has the so-called class $K_i$ of the argument, i.e. the class of the table $T_i$ associated with the available table base $T_i$. The class index $K_i$ refers to the kind of the table $T_i$. A table may be a reference table or an operand table or a table for the indication of a further indirect addressing process. A table may be a table only allowing reading and forbidding writing. A table may be a table forbidden for defined users, etc. The consequences of this class indication will be apparent from the microprogram of this device given hereinafter. The portion L of the table word T comprises the length datum $L_i$ of table $T_i$, the base address of which $T_i$ is also contained in the table word T. This length datum $L_i$ indicates the limit of the table $T_i$. There is a second storage element $FF_2$. The adder $AD_2$ is followed by a sign detector D, which indicates whether during an addressing phase 1 (see hereinafter) the difference between an address component $a_i$ and the table datum $L_i$ of the table $T_i$ formed in the adder $AD_2$ is positive or negative. The sign detector TD control the storage element $FF_2$. The device comprises furthermore gates $P_1$, P2, P3. If an address components $a_i$ lies within the table length $L_i$, the storage element $FF_2$ controls the first gate P*i* along the conductor O′. The table reference address $T_i$ as a table base of the table $T_i$ in the portion MRA of the register MR gets into the adder $AD_1$. The sum $T_i$+$a_i$ formed in the adder $AD_1$ then indicates a table word address $T_i$+$a_i$ in the table $T_i$, which is passed by the first gate P1 to the storage selection register SEL. The table word is selected and the contents ($T_i$+$a_i$) thereof again get into the register MR etc. If an address component $a_i$ falls out of the table length $L_i$, the sign detector TD indicates the same and causes the storage element $FF_2$ to change over ($FF_2$=1). The storage element $FF_2$ then controls the gates $P_2$ and $P_3$ via the conductor 1′. The gate $P_2$ provides that instead of the result of the adder $AD_1$ the table base address $T_i$ arrives in the selection register SEL, which results in the 0-address in the table $T_i$. When organized otherwise, the table base $T_i$ may be completed by any address portion lying within the table, for example, by a portion of a length of $L_i$. At any rate a table word is selected inside the table $T_i$ which indicates whether and, if so, which overflow table is available. If so, the table word has a reference address $T_i'$ as the overflow table base, in which the addressing process can be continued. Said table word itself has a length datum $L_i$, etc. The addressing process then continues in normal manner, the conditions being then such that the address component in register SR to be processed is no longer $a_i$, but the difference $a_i$−$L_i$ in the adder $AD_2$, passed thereto via the third gate P3 and conductor 1′ under the control of the storage element $FF_2$. Again a length check is carried out, etc.

In order to elucidate the operation of the extended device in accordance with the invention the microprogram is described below for addressing in directed-graph structure with overflow tables. Again a number of phases may be distinguished; for the designations and explanation confer also the microprogram given with reference to FIG. 5.

Microprogram with safety means.

| Phase processing | Explanation |
|---|---|
| 0 (a) ($FF_1$=0): =1 or $FF_1$=1 | Storage element $FF_1$ has the same function as FF of the first micro-program; cf. first micro-program, Phase 0 sub (a). |
| (b) (CRF & CRL):=(MRF & MRL): (SEL):=0. | The flag feld & plus the length field of the register MR are transferred to to register CR. The selection register SEL is filled with "0"'s. |
| (c) If DRO, then ((SEL)):=(MR). | DRO=destructive-read-outstore, see Phase 0 sub(d) of first micro-program. |
| (d) If $FF_1$=0 then (OPCDEC):=(MROPC); (MR):=(HR) (SR & CRA):=$2^{8+}$ (MRL) (MRA-MROPC). | See first micro programme, phase 0 sub(b). This means that the first address component enters register SR and the remainder in portion CRA of register CR. The number $2^{8+}$ means that an OP-code of 8 bits is assumed so that for correct setting of the first address component in SR the address portion in CR is shifted over 8+ the number of bits found in MRL (or CRL) as the length of the first address component. |
| (e) If $FF_1$=1, then (MR):=(CR); (SR & CRA):=$2^{(MRL)}$ (MRA). | When a sequential word is read out, the last reference address of a preceding instruction or sequential word returns from register Cr, where it had been saved, back into register MR. A shift is performed under the control of the length field MRL (or CRL): the first address component of a sequential word. |
| (f) Phase:=1 | |
| 1 (a) If (SR)>(L) then $FF_2$: =1; (SR): =(SR)−(L); (SEL): (MRA). | This refers to the table-length check in the adder $AD_2$ (L)=the table length, (SR) is an address component for the table of said length. Transgression of the table limit is ascertained in sign detector TD; storage element $FF_2$ changes over to 1. Through P3 register SR is filled with the difference (SR)−(L)=$a_i-L_i$, which means that the relative address in an overflow table, if any, is prepared. Through gate P2 the selection register SEL is filled with the contents of register portion MRA, indicating the table base. It is assumed here that at the address O of table ($T_i$) a reference address ($T_i'$) for an overflow table $T_i'$ may be present. |
| (b) If (SR≦(L) then $FF_2$:=0 (SEL):= (MRA)+(SR) and (SR & CRA): =$2^{(CRL)}$ (SR & CRA). | If no table is transgressed, element $FF_2$=O and the adder $AD_1$ receives the table base from (MRA) and forms the sum of table base (MRA) and the associated address component of register SR. The result is transferred for selecting the table word through gate P1 to the selection register SEL. Moreover, by a shift over the length concerned, a new address component is introduced into register SR. |
| (c) If DRO, then ((SEL)): =(MR). | If necessary the read-out information is rewritten. |
| (d) Phase: =2 | |
| 2 (a) If ($FF_2$=1) ∧ ((K)=PT or OT) then (MR:=((SEL)). | If transgression occurs (and if the class K of the argument indicates that a reference table PT or an operand table OT follows), register MR is filled with the contents of the address (the overflow table base) selected in the selection register SEL (see Phase 1 sub(a)). |
| If ($FF_2$=O) ∧ ((K)=PT) then also (MR):=((SEL)) Phase: =1. | If no transgression occurs (and if class K of the argument indicates that a reference table PT follows), register MR is filled with the address (normal table word) selected in the selection register SEL (see Phase 1 sub(b)). |
| (b) If ($FF_2$=O) ∧ $\underline{((SR)\neq O)}$ ∧ ((K)=OT) ∧ $\overline{\text{Forbidden}}$ then (MR): =((SEL)); Phase: =function (OPCDEC). | If no transgression occurs and if the address components are left, whereas the class K of the argument indicates that an operand table OT is found and if this operand table is not forbidden (forbidden), the register MR is filled with the operand from the operand table. The subsequent phase is the performance of the operation noted in OPCDEC. |
| (c) If ($FF_2$=0) ∧ ((SR)=0) ∧WV∧∧((K)=PT or OT) then Phase: =3. | There is not transgression and an address component 0 is in register SR and the flag field indicates that there is a sequential word and the class K of the argument indicates that a reference table or an operand table follows, then Phase 3 follows, during which reading out of the sequential word is initiated (cf. first micro program, Phase 2 sub(c)). |
| (d) *If* ($FF_2$=0) ∧ $\underline{((SR)=0)}$ ∧ WV ∧ ∧ $\overline{\text{Forbidden}}$, then (MR): =((SEL)); Phase: =function (OPCDEC). | If there is not transgression and if an address component 0 is found in register SR and if it is indicated that no sequential word is to follow, and if there is no inhibition, register MR is filled with the contents of the address selected by the contents of the selection register SEL. The operation is performed on the resultant contents of MR. |
| (e) If ((SR)≠0) ∧ ((K)≠PT) ∧ ∧Forbidden, then: interruption. | If register SR has an address component and the class K of the argument indicates that the next table is not a reference table and if there is inhibition, a machine interrupt results. |
| $\underline{\text{If}}$ ($FF_2$=0) ∧ ((SR)=0) ∧ $\overline{\text{WV}}$ ∧ ∧Forbidden, then: interruption. | If there is no transgression and if register SR has no address component and if there is no sequential word and if there is inhibition, an interrupt results. |
| If ($FF_2$=1) ∧ ((K)≠PT or OT) then interruption. | In the case of transgression and if the class K of the argument indicates that no reference table or operand table is following, an interrupt will result. |
| If ((SR)≠0) ∧ ((K)=PT or OT) then: interruption. | If an address component is found in register SR and if class K indicates that no reference table or operand table is following, also interrupt results. |
| 3 (a) (CR): =(MR) | The sequential word has to be read out. To this end first the contents of register MR are saved in register CR (see first micro program Phase 3 sub (a)). |
| (b) If DRO, then ((SEL): =(MR). | If necessary contents of register MR are rewritten (see Phase 3 sub (b) of the first microprogram). |
| (c) (SEL) :=(IT) :=(IT)+1 | The sequential word VW is addressed (see Phase 3 sub (c) of the first microprogram). |
| (d) Phase: =4 | |
| 4 (MB): =((SEL)) Phase: =0 | The sequential word is read out and gets into register MR, from where it is further processed in Phase 0 etc. |

FIGS. 10*a*, *b*, *c* illustrates a numerical example of the operation of the device shown in FIG. 9. The table II, FIG. 10*c* indicates what is occurring in the device shown in FIG. 9. In this example the ADD instruction with two sequential words found at the addresses $\alpha_0$, $\alpha_1$ and $\alpha_2$. The address components are arranged from left to right in connection with the use of the register SR (FIG. 9) instead of the mask register MK (FIG. 5).

Figure 10B:
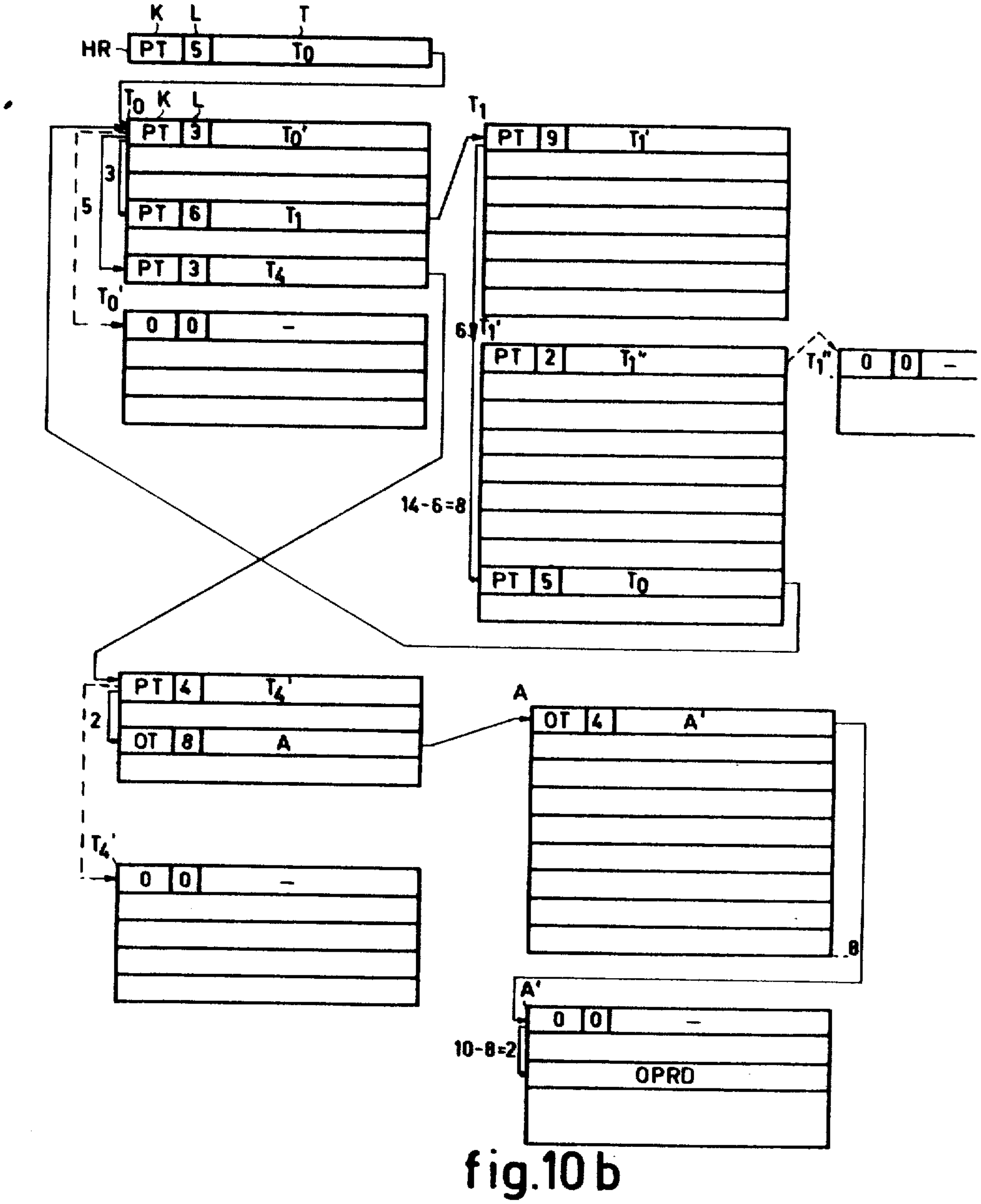

In view of the microprogram described above for the device of FIG. 9 the operation will now be understood. The word in the auxiliary register HR (FIG. 10*b*) indicates that the first address component $a_0$=3 of $\alpha_0$ in a reference table (designated by "PT" at the place K) is found with a length of five words (indicated by "5" at the place L) on the table base address $T_0$. The table base (0°-address in the table) $T_0$ comprises data about the presence of an overflow table $T'_0$ at the overflow table base address $T'_0$. The overflow table $T'_0$ is a reference table (PT) of a length of three words. The table base (0-address in the table) $T'_0$ comprise the datum (O) indicating that there is (are) no further overflow table(s). $a_0$=3, 5 so that addressing does not pass beyond table $T_0$, so that the word is selected at the place 3 of $T_0$. This word indicates that the next table $T_1$ is again a reference table (PT) of a length of six words. At the table base (0°-address) of table $T_1$ it is indicated that there is an overflow table $T'_1$, which is a reference table (PT) of a length of nine words. At the table base (0°-address) of the overflow table $T'_1$ if is indicated that there is a next overflow table $T''_1$, which is again a reference table (PT) of a length of two words and so on. The second address component $a_1$=14 lies beyond the length of table $T_1$ so that a pass-over to the overflow table $T'_1$ takes place. Therein addressing is performed at the place 14–6–8. There is found a word indicating that a further address component $a_2$=5 has again to be addressed in the table $T_1$. Here a closed loop in the addressing process is concerned.

At the address $T_0$+5, wherein 5=$a_2$ a of word $\alpha_0$, a word is then found which indicates that the addressing of a further component has to take place in table $T_4$. Because $a_3$=0 and a sequential word $\alpha_1$ has to follow, table base address $T_4$ is saved in register CR. The sequential word $\alpha_1$ is set in register MR and the process is continued in normal way. The address component $a_0$ (of $\alpha_1$)=2 indicates at the place 2 in table $T_4$ that an operand table (OT as the class K of the argument A of a length of eight words will follows. $a_1$ (of $\alpha_1$)=10 thus lies beyond the operand table A At the base address (0°location) A of the operand table A it is indicated that the address A' has an overflow operand table A' having a length of four words. $a_1$ (of $\alpha_1$)=10 is thus addressed in this overflow table A' at the location 10–8 =2. Since we are now concerned with a selected operand OPRD the addressing process is interrupted and then the microprogram for the ADD instruction (AP) follows (see last line in column F*a* of table II) or an interruption follows in the event of an inhibition.

What is claimed is:

1. A data-processing system comprising a device for addressing with the aid of a computer instruction having an address portion arrayed in accordance with a directed graph structure in the computer store, said store divided into tables, each of said tables having a reference address as a table base and words to be found in numerical sequence relative to the table base in a table are representative of reference addresses for a further table, or operands, or indirect addresses for operands, said addressing device comprising a register for storing an instruction, a register for storing a table word selected from a storage table, and an adder for combining a reference address and a word number resulting in the formation of an absolute table word address for selecting a desired table word, said arrayed address portion of an instruction comprising an arbitrary number of address components for addressing in any directed graph structure, wherein every next-following address component is the number of a word in a table previously located with the aid of a preceding address component or components, said register further including means for selecting the relevant address component for correctly combining an address component with a previously found reference address as a table base in said adder, said means for selecting comprising at least one additional register and a control device for producing a shift of an address component equal to the length thereof in bits, said address component to be processed being available for said adder after said selection in said means for selecting.

2. A data-processing system as claimed in claim 1 wherein the addressing device comprises a storage element which indicates that there is an instruction having a number of address components or that there is a sequential word having one or more address components continuing the instruction or a preceding sequential word for being processes, said sequential word or words together with the instruction defining a complete operand address, the instructions and any sequential words having, in a field designated for this purpose, a bit indication for the presence or absence of one or, if subsequent ones, one further sequential word by which an instruction counter can be stepped by 1.

3. A data-processing system as claimed in claim 1 wherein for addressing in said directed graph structure by instructions and sequential words, if any, both having address components of different lengths, the bit lengths of the address components of an instruction and any sequential words being indicated separately in a field of the instruction and in a field of any sequential words, the control device governed from said length field of an instruction and any sequential words produces a variable shift equal to the variable bit length of the address components of the instruction and any sequential words.

4. A data-processing system as claimed in claim 3 wherein the bit lengths of the address components of an instruction and any sequential words are indicated in a separate table which is accessible from the length field of the address components of an instruction and any sequential words, said control device being adjustable from said table.

5. A data-processing system as claimed in claim 1, wherein a table word (T) has a table length field (L) for a next table, and the addressing device comprises a second storage element ($FF_2$), and in that a second adder ($AD_2$) is followed by a sign detector (TD), indicating whether the difference between an address component ($a_i$) and the table length datum ($L_i$) of the table ($T_i$) concerned defined during an addressing phase in the second adder ($AD_2$) is positive or negative and controlling the second storage element ($FF_2$); if an address component ($a_i$) lies within the table length ($L_i$), the second storage element ($FF_2$) controls a first gate ($P_1$), through which the table reference address ($T_i$) can be transferred from the register for storing the table word (MR) to the first adder ($AD_1$) and through which first gate ($P_1$) the result of the addition of the address component ($a_i$) to the table reference address ($T_i$) can be transferred to the selection register (SEL); if an address component ($a_i$) lies beyond the table length ($L_i$), the second storage element ($FF_2$) controls a second gate (P2) and a third gate (P3), the second gate (P2) transferring the table reference address ($T_i$) as a basic address or, as the case may be, completed to an address in the table where a reference address ($T'_i$) is present as the table base of an overflow table, to the selection register (SEL), where the reference address towards the overflow table base ($T'_i$) is selected, whilst the third gate (P3) is capable of transferring the difference ($a_i - L_i$) formed in the second adder ($AD_2$) between the address component ($a_i$) and the table length ($L_i$) towards the register portion (SR) of the selecting the address component, after which in the first adder ($AD_1$) the address ($T'_i+(a_i-L_i)$) is formed in the overflow table ($T'_i$).

6. A data-processing system as claimed in claim 5, wherein a table word (T) contains a table class datum (K) of a next table, whilst if the table class datum (K) indicates that an operand table (OT) is following, the addressing precess is interrupted.

7. A data-processing system as claimed in claim 6 wherein the table class datum (K) contains information about the permission or nonpermission of a further addressing or operation step.

PO-1050
(5/69)

UNITED STATES PATENT OFFICE
CERTIFICATE OF CORRECTION

Patent No. 3,614,746 Dated October 19, 1971

Inventor(s) JACOB FREDRIK KLINKHAMER

It is certified that error appears in the above-identified patent and that said Letters Patent are hereby corrected as shown below:

Col. 1, line 11, "comprising" should be --includes--;
line 15, after "formed" insert --and--;
line 18, "in" (1st occurence) should be --as--;
line 18, cancel "for use in";
line 20, cancel ", which" and insert --. This--;
line 53, "able" should be --table--;
Col. 2, line 8, after "components" insert --.--;
line 9, cancel "whereas in" and insert --In--;
line 54, "B" should be --b--;
line 55, "++b" should be --+b--;
line 56, "interative" should be --iterative--;
line 56, after "which" insert --a--;
line 64, "a" (2nd occurence) should be --the--;
Col. 3, line 2, "work" should be --word--;
line 20, "he" should be --the--;
line 25, "he" should be --the--;
Col. 4, line 9, "filed" should be --field--;

PO-1050
(5/69)

UNITED STATES PATENT OFFICE
CERTIFICATE OF CORRECTION

PAGE 2

Patent No. 3,614,746 Dated October 19, 1971

Inventor(s) JACOB FREDRIK KLINKHAMER

It is certified that error appears in the above-identified patent and that said Letters Patent are hereby corrected as shown below:

Col. 4, line 20, before "instruction" delete "in";

line 32, "one" should be --One--;

Col. 5, line 21, after "decoder" delete ".";

line 22, delete "37";

line 38, "ad" ahould be --AD--;

line 64, "posibility" should be --possibility--;

line 65, "$1A_1$" should be --$la_1$--;

line 72, "i $a_o$" should be --$la_o$--;

Col. 6, line 42, (app.) Table 0 (b) Explanation, line 4, after "CROPC-" insert --field--;

Col. 7, line 53, "2)bits." should be --2 bits).--;

line 54, "$>$" should be -- = --;

line 65, "its" should be --it--;

line 73, after "With" insert --the--;

Col. 8, line 19, "table" should be --tableword-- line 33, "D" should be --TD--;

line 37, "control" should be --controls--;

line 39, "$P_1$" should be --P1--;

PO-1050
(5/69)

UNITED STATES PATENT OFFICE
CERTIFICATE OF CORRECTION

Patent No. 3,614,746 Dated October 19, 1971

Inventor(s) JACOB FREDRIK KLINKHAMER

It is certified that error appears in the above-identified patent and that said Letters Patent are hereby corrected as shown below:

Col. 10, line 16, (app.) In phase pricessing last equation line 1, "=" should be --≠--;

line 48, "(0-ad-" should be --(0°-ad- --;

line 57, "if" should be --it--;

line 66, before "of" cancel "a";

line 74, after "argument" insert --,--;

Col. 11, line 1, before "At" insert --.--;

IN THE CLAIMS

Claim 5, line 24, "whilst" should be --while--;

Claim 6, line 3, "whilst" should be --while--;

line 4, "precess" should be --process--.

Signed and sealed this 29th day of August 1972.

(SEAL)
Attest:

EDWARD M.FLETCHER,JR.
Attesting Officer

ROBERT GOTTSCHALK
Commissioner of Patents